United States Patent Office 2,829,962
Patented Apr. 8, 1958

2,829,962
METHOD OF PRODUCING TUNGSTEN SPONGE OR POWDER OF HIGH PURITY

Lester D. Supiro, East Orange, N. J.

No Drawing. Application March 22, 1955
Serial No. 496,045

21 Claims. (Cl. 75—84)

This invention relates generally to making relatively pure tungsten in sponge or powder form. More specifically, the present invention relates to the decomposition and simultaneous reduction of scheelite ore.

It is among the objects of this invention to use both natural or artificial scheelite or both in combination in the manufacture of tungsten sponge and powder without the intermediate step of forming tungstic acid or tungstic oxide, or associated compounds.

It is a further object of this invention to form tungsten sponge or powder of relatively high purity from sodium tungstate or calcium tungstate. Sodium tungstate and calcium tungstate of suitable purity may be derived by conventional means from naturally occurring wolframite and scheelite.

It is yet a further object of this invention to eliminate the necessity for discretely and separately purifying tungstic acid or tungstic oxide, as is necessary in conventional methods.

It is yet a further object of the present invention to effect economies in the formation of tungsten powder or sponge of relatively a high purity by the elimination of numerous separate steps in the process of formation, such separate steps being costly and time-consuming and by eliminating completely losses of tungsten during the thermal step in the process.

It is a further object of the present invention to avoid, as an intermediate step, the formation of tungstic acid which is colloidal in nature and readily occludes impurities; such colloidal tungstic acid requires tedious and costly methods for elimination of impurities before further procedures may be followed.

Yet another object is to provide a process in which there is no requirement for large amounts of energy, either in the form of heat, or electricity.

Another object is to utilize a material either readily available or readily derived from materials having a low tungsten content.

A still further object is to form a tungsten sponge or powder of high purity from sodium tungstate in a single step thermal process involving decomposition, reduction, and volatilization.

A still further object is to form a tungsten sponge or powder of high purity from calcium tungstate by subjecting the calcium tungstate to a pyrometallurgical process, thereby making it possible to effect the complete removal of the calcium oxide component by leaching out with a mineral acid.

Another object is to refine tungsten without use of costly equipment.

Another object is to refine tungsten from relatively inexpensive materials with relatively inexpensive reagents.

In the past, carbon reduced tungsten has been prepared by a reduction of calcium tungstate with carbon; sodium tungstate may likewise be reduced with carbon:

$$CaWO_4 + 3C \rightarrow CaO + 3CO + W$$
$$Na_2WO_4 + 3C \rightarrow Na_2O + 3CO + W$$

The reduction may be also carried on with an ammonium salt, such as ammonium chloride:

$$2NH_4Cl + Na_2WO_4 + 3C \rightarrow 2NH_3 + 2NaCl + H_2O + 3CO + W$$

This reaction may take as much as 15 hours, and is carried on at temperatures of 1000 to 1150° C. The relative purity of the tungsten powder may be of the order of 90%. In contrast, the present invention results in a tungsten powder or sponge which is 99.5% pure or better and involves no losses of tungsten during the thermal step in the process. Furthermore, the time required for the thermal step in my process is only 30 minutes, in contrast to the many hours required by the foregoing process.

Tungsten powder has also been conventionally produced by reducing tungstic oxide with carbon. In order to arrive at a product which has a relatively high degree of purity, it is necessary to resort to a relatively costly grade of tungstic oxide; otherwise, the end product would not be suitable for many applications. The reaction is carried on at relatively high temperatures and over a long preiod of time. It is to be noted that tungsten powder produced by reduction with carbon is invariably contaminated with considerable amounts of tungsten carbide. The hydrogen reduction method is preferable because of the higher degree of purity achieved.

In the conventional process, tungstic oxide is first obtained by treating scheelite or sodium tungstate with boiling hydrochloric acid. However, the tungstic oxide thus obtained may contain contaminants in amounts ranging from 1–20%. These contaminants may consist of undecomposed ore, silica, silicates, tin, iron, calcium, etc. In this condition the tungstic oxide is utterly unusable for the manufacture of tungsten, for not only is the metal difficult enough to work even when pure, but this difficulty is increased enormously when very small amounts of certain elements are present. Tungsten containing 0.1% of iron, for example, is practically unworkable owing to brittleness, small amounts of nickel and chromium having a similar effect. Hence, these and other impurities must be eliminated before the oxide can be reduced to metal of the requisite purity. Such purification involves either repetitive solution and precipitation of tungstic oxide (or tungstic acid) or the conversion of the tungsten oxide or acid to ammonium paratungstate—both costly procedures.

In my process all these intermediate, costly, and time-consuming steps are eliminated, and the tungsten powder or sponge obtained requires no further purification. Repeated chemical and spectrographic analyses have revealed total impurities of less than 0.2% and a non-volatile matter content of less than 0.02%. Non-volatile matter is a general term which includes calcium, silica, and alkali metals which persistently remain with the tungstic oxide during the conventional manufacturing process.

When calcium tungstate is placed in an atmosphere of hydrogen and raised to a temperature of 750° C. or higher, the calcium tungstate is partially reduced to lower oxides of tungsten and some metal. The reduction of the calcium tungstate to tungsten sponge or powder is not achieved as might be expected, possibly because the mass of calcium tungstate is impenetrable to the hydrogen atmosphere; a further reason why the reduction is not complete may be because the calcium oxide component of calcium tungstate resists separation from the tungsten component of the calcium tungstate. In addition, the calcium tungstate itself may be inherently impenetrable to hydrogen, and the decomposition products may form an additional impenetrable barrier which prevents the reduction from going to completion. However, regardless of whether a physical coating or a chemical bond is involved, an addition agent was thought to be the key to breaking the bond of affinity existing between the calcium oxide and the tungstic oxide component of the calcium tungstate.

Efforts to create accessibility of the calcium tungstate to the hydrogen by the addition of calcium carbonate, gelatins, sodium chloride, ammonium chloride, magnesium carbonate, and other materials proved unavailing. The theory of using these addition agents (fluffing agents) was that they would not only cause the entire mass of calcium tungstate to be permeated with innumerable voids, thereby making it accessible to the hydrogen, but that they also might break the bond of affinity between the calcium oxide and the tungstic oxide component of the calcium tungstate, yet they themselves would not contaminate the end products, but would leave an easily removable residue or no residue at all.

Calcium tungstate at normal temperatures is powdery in form. However, at elevated temperatures it became a relatively solid conglomerate, and the aforementioned addition agents did nothing to impart a character to permit reduction by hydrogen. Numerous internal voids were created. The affinity of the tungsten component for the calcium oxide component of calcium tungstate still seemed to exist undiminished.

Regardless of increases in temperature, regardless of combinations of the aforementioned fluffing agents, regardless of the quantitative presence of the fluffing agents, no complete reductions of the calcium tungstate to relatively pure tungsten sponge or powder were obtained. The object of achieving relatively pure tungsten mixed with calcium oxide as a separate entity, which would be readily removable, was not achieved; the products of the reduction still persisted as quantities of calcium tungstate plus lower oxides of tungsten and amounts of calcium oxide.

Another attack upon calcium tungstate was through the use of mineral acids in the hope that the calcium tungstate would decompose into tungstic acid and the calcium salt of the mineral acid, in the belief that this mass could be reduced to tungsten metal powder and the calcium salt of the mineral acid. If this reduction could be achieved, the calcium salt of the mineral acid could be removed by a suitable leaching process, but here again, the bond of affinity between the calcium component of calcium tungstate and the tungsten component remained unbroken.

A double attack upon the unity of calcium tungstate was made by using the aforementioned addition agents plus the mineral acids, but again the desired decomposition was not achieved, nor was the reduction achieved. Combinations of ammonium chloride and hydrochloric acid, respectively the addition (fluffing) agent and the mineral acid, were added to calcium tungstate in varying amounts and at varying temperatures in an atmosphere of hydrogen; the reduction did not take place.

Another approach to the disintegration was the attempt to utilize a single addition agent which would, by its nature, partake of the charatcer of both a fluffing agent and a decomposition agent. Hydrobromic acid would be a material which might form the desired voids in the decomposing mass, so that the products of disintegration could be reduced to tungsten powder or tungsten sponge by the action of hydrogen:

$$CaWO_4 + 2HBr \rightarrow H_2WO_4 + CaBr_2$$
$$H_2WO_4 \rightarrow WO_3 + H_2O$$
$$WO_3 + 3H_2 \rightarrow 3H_2O + W$$

It was expected that when the temperature of the reaction rose above 810° C. (the boiling point of $CaBr_2$), the calcium bromide would boil off, leaving tungstic acid which would disintegrate into water and tungstic oxide and then be reduced by the hydrogen to more water and tungsten metal. This did not occur.

Identical procedures were followed with sodium tungstate with identical results.

Another similar approach was considered, that of formulating a decomposition product which might be expected to readily volatilize off, if the temperature were high enough. For this purpose, boric acid was chosen in the expectation that sodium or calcium borate would be formed. Boric acid seemed to be ideal because its water component would act as a fluffing agent, its affinity for sodium or calcium oxide would rather readily cause the formation of sodium or calcium borate, which would be volatilized off under proper conditions of temperature.

In using the boric acid with sodium tungstate, sodium borate would be formed which would volatilize completely.

$$Na_2WO_4 \cdot 2H_2O + 4H_3BO_3 + 3H_2 \rightarrow Na_2B_4O_7 + W + 11H_2O$$

In using boric acid with calcium tungstate, the following principal reaction took place:

$$2CaWO_4 + 2H_3BO_3 + 6H_2 \rightarrow 2CaO \cdot B_2O_3 + 2W + 9H_2O$$

The calcium tungstate reacted with the boric acid in an atmosphere of hydrogen to form principally dicalcium diborate, water and tungsten. Among other compounds of calcium oxide and boric acid which may form in varying slight amounts from the fusion of boric acid and calcium oxide are: calcium orthoborate, $(3CaO \cdot B_2O_3)$, calcium metaborate, $(CaO \cdot B_2O_3)$, calcium tetraborate, $(CaO \cdot 2B_2O_3)$; and calcium sesquiborate, $2CaO \cdot 3B_2O_3$. All of these compounds are completely soluble in dilute or concentrated acid. Dicalcium diborate is only sparingly soluble in water. Dilute or concentrated hydrochloric acid will readily dissolve the dicalcium diborate, leaving the tungsten sponge or powder of a degree of purity of approximately 99.8%. The removal of the dicalcium diborate and the other compounds of calcium oxide and boric acid is not to be understood as being limited to leaching with hydrochloric acid, as any acid which forms a soluble calcium salt and/or soluble borate is suitable.

Reference has been had to leaching with hydrochloric acid. It is to be understood that the selection of the acid is merely a matter of choice as long as the acid chosen does not attack the tungsten sponge or powder to any appreciable extent.

Reference has been had to a hydrogen atmosphere as a reducing agent. It is to be understood that carbon monoxide may also be used as well as mixtures of hydrogen and carbon monoxide for the reducing atmosphere. Choice of reducing agents is not confined to gaseous substances for carbon and carbonaceous compounds may be used. If carbon is chosen as a reducing agent, tungsten carbide is not a serious factor as a contaminant because the reduction is completed before substantial amounts of tungsten carbide are formed. In prior techniques involving carbon without the intervention of boric acid, the reduction was so protracted that large amounts of tungsten carbide were formed and contaminated the end product. Moreover, with boric acid as already noted, the calcium and sodium compounds are readily removable, yielding a tungsten product of 99% or better purity in contradistinction to 90% purity yield of the old method.

It should be further noted that if the conditions of the reaction are continued for a sufficiently long period of time, and at a sufficiently high temperature, the dicalcium diborate will ultimately all go into vapor phase and be carried off, leaving the residue pure tungsten powder or sponge. In the interest of economy, however, when the reaction is complete with the formation of tungsten powder or sponge and calcium borates, the reduction is discontinued and the calcium borates are removed economically through the use of the acid, as aforementioned.

When sodium tungstate is used, the results are equally as good. However, it should be noted that borates of sodium are much more volatile than borates of calcium, and they are much more numerous. Borates of sodium in general are much more volatile when heated, and leave no residue. It should also be further noted that due to the higher solubility of the sodium borates in water, the use of either dilute or concentrated acid to eliminate unvolatilized borates of sodium may be dispensed with and water may be used to leach out these residual borates, if any. Since many borates of sodium may be only sparingly soluble in cold water, and since their solubility greatly increases with the temperature of the water, it is expedient to use water at an elevated temperature to leach out the unvolatilized borates of sodium, if any remain.

Having separated the borates from the metallic tungsten, our end product is a sponge which can be readily crushed to powder if the powder form is desired. The purity of the end product may be 99.5% or better. The boric acid in the present reaction does not function merely as a flux to take up and remove an independent separate compound involved with the calcium tungstate, but actually reacts with the calcium tungstate to cause its disintegration into components with the formation of new compounds. Thus, a fluxing action is not involved. If the boric acid were to remove calcium oxide which was present in addition to calcium tungstate, then its reaction would be said to be a fluxing action; but the boric acid enters into reaction with the calcium tungstate itself; this is not the typical fluxing action but, on the contrary, a reaction in which an interchange of radicals takes place between the reacting agents. In addition, the speed with which the reaction takes place strongly points to the possibility that the boric acid, or its compounds with calcium oxide, acts as a catalyst. The operation of using a flux, commonly known as fluxing, is one in which impurities are removed, leaving as a residue the ultimately desired metal compound. This compound must subsequently be reduced to its relatively pure metallic state as the end product.

USE OF $B_2O_3$

An investigation of the mechanism of the reaction revealed that the action of the boric acid was not limited only to decomposing the scheelite. The hypothesis that a fluffing agent was needed and that the water component of boric acid might supply this requirement, was borne out completely by mixing scheelite with boric oxide in the proper proportions and subjecting the mix to the standard operating procedure described in Example 1 below. The recovery of tungsten powder averaged only 81.35% as compared to a recovery of 96.34% when boric acid was used.

An operating temperature of 1200° C. has been found to give the highest recovery of tungsten powder possessing the lowest percentage of impurities. When runs made according to the procedure described in Example 1 (infra) and the furnace temperature was varied, a comparison of the recoveries and purities of the tungsten powder was as follows:

| Furnace Temperature, °C. | Percent Recovery of Tungsten Powder | Percent Non-Volatile Impurities in Tungsten Powder |
|---|---|---|
| 700 | 17.70 | 1.48 |
| 800 | 61.14 | 0.79 |
| 900 | 68.47 | 0.71 |
| 1,000 | 87.62 | 0.28 |
| 1,100 | 94.52 | 0.08 |
| 1,200 | 96.34 | 0.02 |

Not only was the recovery rate higher, but also the product at 1200° C. possessed superior stability and had superior physical properties for alloying purposes and for the manufacture of certain carbides of tungsten.

In conventional processes, tungstic acid is recovered by running the calcium tungstate sludge into a boiling mixture of 50% commercial hydrochloric acid and 50% water. The efficiency of extraction by this process varies with the ore; it may be as low as 60% with low grade ore or over 90% with ores of high purity. The tungstic oxide obtained contains up to about 95.5% $WO_3$, the remainder being chiefly sodium, calcium, and silica with traces of iron and alumina.

However, in my process, tungsten recoveries from six runs averaged as follows:

| | Percent |
|---|---|
| Tungsten powder | 96.34 |
| Tungsten recovered from residual effluent by precipitation | 3.04 |

Moreover, in the conventional processes, it is not uncommon for several percent or more of the ore to remain unattacked by the acid or alkali. The tungsten from this ore residue may be recovered only with the greatest difficulty and at great expense. But, in my process, the tungsten contained in the residue effluent may be recovered as calcium tungstate by a simple precipitation procedure which results in an overall tungsten recovery of over 99%. It is also noteworthy that the boric acid can be recovered from the residue effluent by the procedure of fractional crystallization and reused.

The principal reaction which takes place during the leaching step may be expressed by the following equation:

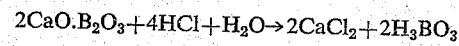

$$2CaO.B_2O_3 + 4HCl + H_2O \rightarrow 2CaCl_2 + 2H_3BO_3$$

The weight of hydrochloric acid used was determined by these considerations: The concentrated hydrochloric acid solution had a specific gravity of 1.20 and assayed 37% hydrochloric acid by weight.

The highest possible concentration of hydrochloric acid was desired in order to speed the solution, in accordance with the above equation, of the dicalcium diborate; moreover, for the sake of effecting economies in handling, it is important to keep the solution volumes to a minimum. However, when the hydrochloric acid concentration exceeded a specific gravity of 1.0943, the tungsten tended to oxidize. Therefore, acid of a concentration of 1.0943 specific gravity was used; an amount was selected so as to provide a 47% excess over the stoichiometric requirement derived from the equation above in order to further speed the solution of dicalcium diborate and in order to provide a good working excess to compensate for losses during boiling.

Calcium or sodium tungstate may be involved with impurities such as silica sulphur, phosphorus, free calcium oxide, calcium hydroxide, calcium carbonate, tin, arsenic, antimony, copper and molybdenum (see Example 4 infra). Many of these impurities are volatilized in the presence of the hydrogen and driven off from the reactants, due to the elevated temperature. However, the boric acid in this reaction may serve a dual function, not only as one of the reacting agents, but also as a fluxing agent to combine with the aforesaid impurities resulting in the formation of acid and water soluble compounds and/or to permit access of these impurities to the hydrogen so that they may be readily volatilized.

For example, the silica is very probably eliminated as a complex compound of silicon and boron which is dissolved away from the tungsten residue during the leaching and washing steps. A comparison of the initial and final percentages of impurities is given below:

| | Initial Impurities in Scheelite in Percent | Final Impurities in Tungsten Powder, Percent |
|---|---|---|
| Phosphorous | 0.09 | 0.02 |
| Sulfur | 0.18 | 0.09 |
| Tin | 0.25 | 0.11 |
| Molybdenum | 0.40 | 0.37 |

Example 1

INGREDIENTS

Ten parts by weight of calcium tungstate (76.74% tungstic oxide, .02% molybdenum, .02% phosphorus, .0002% arsenic, .05% antimony, traces of copper, remainder calcium oxide) preferred degree of fineness 100 mesh or finer.

Two parts by weight boric acid, preferred degree of fineness 100 mesh or finer.

PROCEDURE

Ingredients are thoroughly mixed and placed in a nickel boat, or other suitable metal vessel, and are placed in a tube furnace and brought to a temperature of 1200° C. The ensuing reaction is permitted to continue for one-half hour in a stream of hydrogen. The boat and contents are allowed to return to room temperature while constantly in hydrogen atmosphere.

Contents of the boat are then leached with 2.19 parts by weight of hydrochloric acid of 1.0943 specific gravity (at 60° F.). The hydrochloric acid should be boiling and the leaching should continue for approximately 10 minutes. At the end of this period, hot water is added to bring the total volume up to about five times the initial volume. The residue is filtered and washed with hot water until the absence of calcium is noted in the effluent. In the event that any amounts of the tungsten residue are oxidized in the course of the leaching action, they may be removed by washing with a 60° to 70° C. solution of 1% by weight of sodium hydroxide. The wash should continue until the effluent is free of any traces of tungsten. The sodium hydroxide in the residue should be removed with a hot water wash until the effluent shows substantial neutrality. Upon drying the tungsten, the process is complete. If air drying is resorted to, the temperature of the air may be approximately 90° to 95° C.

Example 2

INGREDIENTS

Ten parts by weight of sodium tungstate (70.30% tungstic oxide), preferred degree of fineness 100 mesh or finer, and 8.25 parts by weight boric acid, preferred degree of fineness 100 mesh or finer.

PROCEDURE

Ingredients are thoroughly mixed and placed in a nickel boat, or other suitable vessel, and are placed in a tube furnace and brought to a temperature of 1200° C. The ensuing reaction is permitted to continue for one-half hour in a stream of hydrogen. Boat and contents are allowed to return to room temperature while constantly in hydrogen atmosphere.

Contents of the boat are then leached in ten parts by weight of boiling water for approximately ten minutes. At the end of this period, the residue is washed with hot water until the absence of sodium is noted in the effluent. In the event that any amounts of the tungsten residue are oxidized in the course of the leaching action, they may be removed by washing with a 60° to 70° C. solution of 1% by weight of sodium hydroxide. The wash should continue until the effluent is free of any traces of tungsten. The sodium hydroxide in the residue is removed with a hot water wash until the effluent shows substantial neutrality. Upon drying the tungsten, the process is complete. If air drying is resorted to, the temperature of the air should be approximately 90° to 95° C. As an alternative, the tungsten may be dried in inert atmosphere or under vacuum.

*Example 3 (For scheelite with tungstic oxide content less than 76%, but not less than 70%)*

INGREDIENTS

Ten parts by weight of calcium tungstate (70.11% tungstic oxide), preferred degree of fineness 100 mesh or finer.

Five parts by weight boric acid, preferred degree of fineness 100 mesh or finer.

PROCEDURE

Ingredients are thoroughly mixed and placed in a nickel boat or other suitable vessel. From this point the procedure followed is exactly the same as given in Example 1.

*Example 4: (For substandard scheelite ($WO_3$ approximately 76%) and sodium tungstate ($WO_3$ approximately 70%) containing abnormal amounts of silica, phosphorous, tin, arsenic, antimony, copper, and molybdenum)*

INGREDIENTS

Ten parts by weight of scheelite, preferred degree of fineness 100 mesh or better.

Four parts by weight of boric acid, preferred degree of fineness 100 mesh or better.

PROCEDURE

As in Example 1.

In practicing the procedures cited above, the seeming requisite amounts of boric acid are not to be determined by the stoichiometry in accordance with the basic equation aforementioned, since the formation of other compounds of calcium oxide and/or impurities and boric acid may give rise to a need for more or less boric acid. The exact need may be easily determined by laboratory analysis of the particular batch of material being processed.

At 700° C. only 17% tungsten is recovered. At 1200° C. recovery is approximately 96%. To raise the reaction temperature beyond 1200° C. is not practical or useful because, in time, the reaction goes to completion at 1200° C. It is, however, possible to carry out the reaction above 1200° C. As the melting point of tungsten (approximately 3380° C.) is approached, the rate of volatilization of by-products increases.

While I have heretofore referred to calcium tungstate and sodium tungstate, which are the materials most commonly available, it should be noted that alkaline earth tungstates and alkali metal tungstates can be used in the same manner with satisfactory results.

I have heretofore referred to tungsten and its compounds. The foregoing method may be applied to the formation of molybdenum, powder, or sponge of high purity. The materials used will be alkaline earth molybdates and alkali metal molybdates which compounds are analogous in all respects to their respective tungsten compounds and react in a completely analogous manner.

The foregoing specification and examples are intended merely to be illustrative of specific embodiments of my invention and not as limitations thereon, for many changes may be made within the scope of the appended claims without departing from the spirit of the invention.

I claim:

1. The method of producing tungsten of high purity comprising reacting material selected from the group consisting of alkaline earth tungstates, alkali metal tungstates, mixtures thereof, with boric acid in the presence of a reducing agent at approximately 1200° C.

2. The method of producing tungsten of high purity comprising reacting calcium tungstate with boric acid in the presence of a reducing agent at approximately 1200° C.

3. The method of producing tungsten of high purity comprising reacting calcium tungstate with boric acid in the presence of a reducing agent at approximately 1200° C., leaching out the resultant calcium compounds from the residue with a mineral acid which forms soluble calcium salts and soluble borates and does not appreciably attack the tungsten.

4. The method of producing tungsten of high purity comprising reacting calcium tungstate with boric acid in the presence of a reducing agent at approximately 1200° C., leaching the residue until only the tungsten component remains.

5. The method of producing tungsten of high purity comprising reacting sodium tungstate with boric acid in the presence of a reducing agent at approximately 1200° C.

6. The method of producing tungsten of high purity comprising reacting sodium tungstate with boric acid in the presence of a reducing agent, volatilizing-off the resulting sodium borate.

7. The method of producing tungsten of high purity comprising the process of claim 4 in which the leaching agent is hydrochloric acid.

8. The method of producing tungsten of high purity comprising the process in accordance with claim 1, in which hydrogen is the reducing agent.

9. The method of producing tungsten of high purity comprising the process in accordance with claim 1 in which carbon monoxide is the reducing agent.

10. The method of producing tungsten of high purity comprising the process in accordance with claim 1 in which carbon is the reducing agent.

11. The method of producing tungsten of high purity comprising the process in accordance with claim 1 in which a carbonaceous compound is the reducing agent.

12. The method of producing tungsten of high purity comprising reacting calcium tungstate with boric acid in the presence of a reducing agent at approximately 1200° C., volatilizing off the resultant calcium compounds from the residue.

13. The method of producing tungsten of high purity comprising the process of claim 5, leaching the resultant sodium compounds from the residue with water.

14. The method of producing tungsten of high purity comprising reacting material selected from the group consisting of alkaline earth tungstates, alkali metal tungstates, mixtures thereof, with boric acid in a hydrogen atmosphere at a temperature of approximately 1200° C.

15. The method of producing tungsten of high purity comprising reacting material selected from the group consisting of alkaline earth tungstates and alkali metal tungstates and mixtures thereof, with boric acid in the presence of hydrogen at approximately 1200° C.

16. The method of producing molybdenum of high purity comprising reacting material selected from the group consisting of alkaline earth molybdates and alkali metal molybdates and mixtures thereof, with boric acid in the presence of a reducing agent at approximately 1200° C.

17. The method of producing molybdenum of high purity comprising reacting material selected from the group consisting of alkaline earth molybdates and alkali metal molybdates and mixtures thereof, with boric acid in the presence of hydrogen at approximately 1200° C.

18. The method of producing tungsten of high purity comprising reacting material selected from the group consisting of alkaline earth tungstates, alkali metal tungstates, mixtures thereof with boric acid in the presence of material selected from the group consisting of hydrogen, carbon, and a carbonaceous compound.

19. The method of producing tungsten of high purity comprising reacting a metallic tungstate with boric acid in the presence of a reducing agent.

20. The method of producing tungsten of high purity comprising reacting material selected from the group consisting of alkaline earth tungstates, alkali metal tungstates, mixtures thereof, with boric acid in the presence of material selected from the group consisting of hydrogen, carbon, and carbonaceous compounds to form a metallic tungsten product and a borate by-product.

21. The method of producing tungsten of high purity comprising reacting a metal tungstate with boric acid in the presence of a reducing agent to form a metallic tungsten product and a borate by-product.

References Cited in the file of this patent

UNITED STATES PATENTS

| Number | Name | Date |
|---|---|---|
| 946,551 | Majert | Jan. 18, 1910 |
| 1,552,122 | De Graaff | Sept. 1, 1925 |
| 2,077,873 | Braselton | Apr. 20, 1937 |
| 2,454,322 | Iredell et al. | Nov. 23, 1948 |